United States Patent Office 3,434,680
Patented Mar. 25, 1969

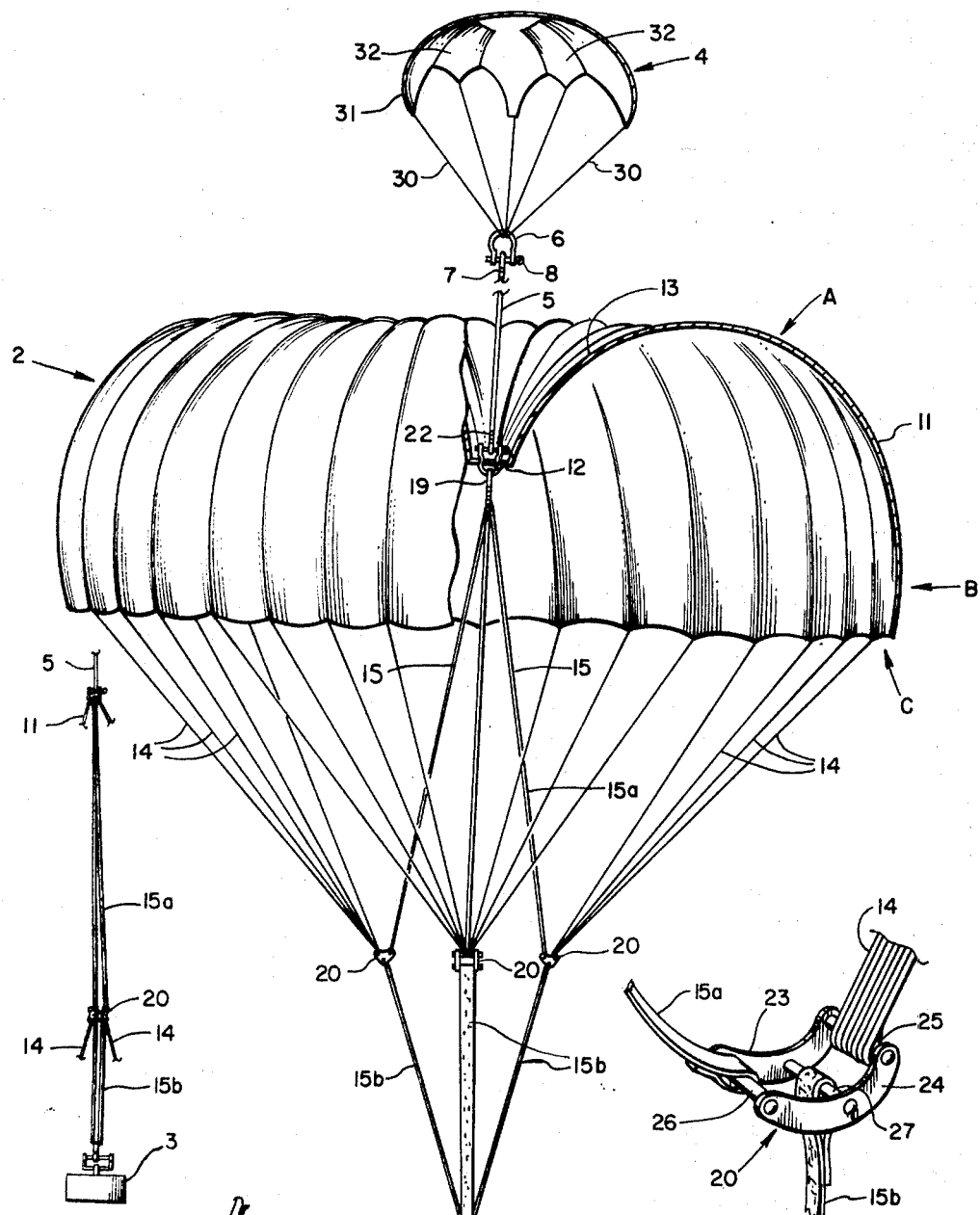
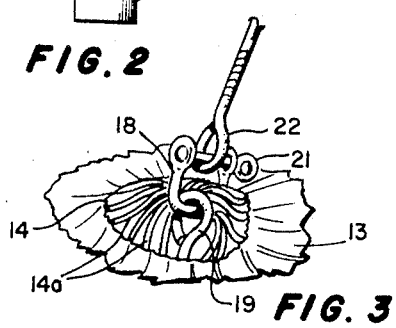

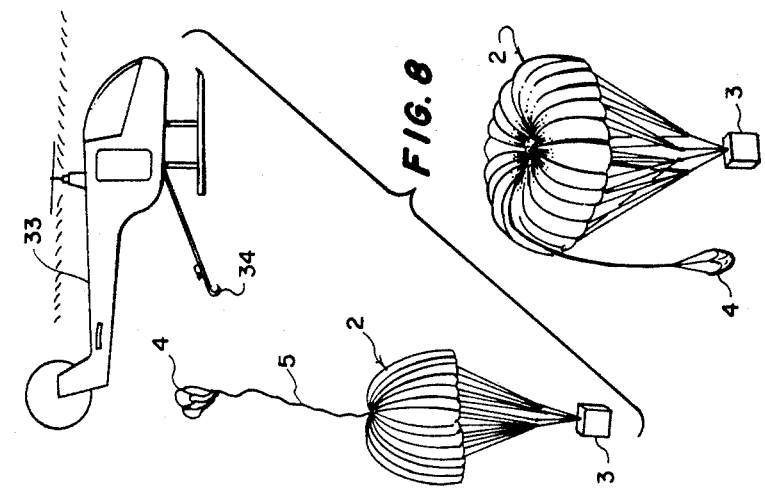
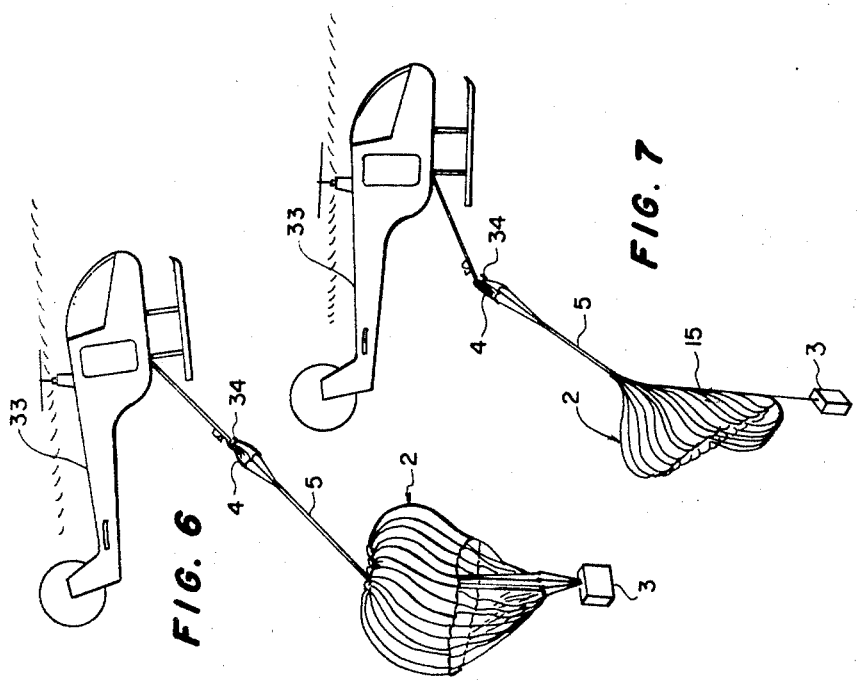
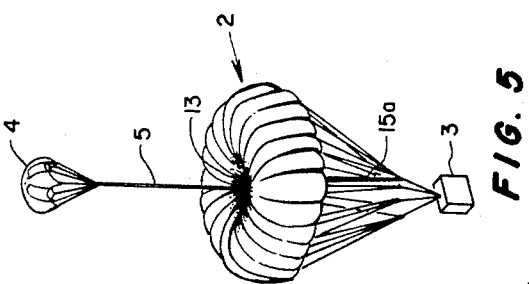

3,434,680
REREEFING PARACHUTE ASSEMBLY
AND SYSTEM
Otis B. Ferguson, Alamogordo, N. Mex., assignor to Recovery Systems Research, Inc., Alamogordo, N. Mex., a corporation of New Mexico
Filed May 29, 1967, Ser. No. 642,103
Int. Cl. B64d 17/26, 1/00, 17/68
U.S. Cl. 244—142
14 Claims

ABSTRACT OF THE DISCLOSURE

A parachute having a novel suspension and rigging assembly carried by the canopy making it suitable for gravitational payload drops, payload towing by aircraft and reopening for airborne support of the payload upon release and mid-air recovery of the payload preceding such towing in a mid-air recovery system and the parachute having a canopy with a central portion pulled down from its topmost portion while airborne in a payload bearing condition.

---

This invention relates to payload supporting parachutes and mid-air recovery systems utilizing such parachutes which are capable of reopening to again support the payload after towing forces have been terminated and is related to my copending application Ser. No. 559,197 filed June 21, 1966, now U.S. Patent No. 3,389,886, assigned to the same assignee.

Recent activity in air and outer space travel has increased the need for the airborne suspension and return to earth from preselected elevations of various types of payloads including, inter alia, targets, instrument packages, aircraft, cargo, and personnel. Applications for parachutes for airborne suspension of such payloads include the simple payload drop, the towing of a payload and parachute for low level drops for delivery of the payload to a preselected location and in mid-air recovery systems inclusive of parachutes wherein such towing is preceded by a mid-air engagement of the system by a recovery aircraft.

In general, a parachute comprises a canopy having a plurality of equally spaced lines usually referred to as suspension or shroud lines carried thereby which support the payload in a depending manner from the inflated canopy while airborne. The central portion of the canopy where the suspension lines cross is usually the topmost point of the canopy while airborne and is referred to as the apex. Such canopies are usually circular in shape and more recently canopies of generally square shape have been employed for certain applications.

Previous mid-air recovery systems have incorporated various forms of such parachutes as the main load bearing parachute and also as the auxiliary or engagement parachute having sufficient drag so as to be maintained in a position suspended above the main parachute and interconnected thereto by a load line. More recent mid-air recovery systems have employed arrangements for collapsing the main parachute and complete release of the main parachute after engagement of the payload by the recovery aircraft followed by towing or drawing of the payload into the recovery aircraft.

In my copending application above referred to there is described a main parachute and mid-air recovery system utilizing a main parachute which is capable of reopening or redeployment after recovery has been aborted or release is desired wherein the canopy and it associated suspension or rigging or reefing lines are interrelated so as to contract the canopy when the payload is being supported from above and for returning the canopy to an inflated load bearing condition when the forces from above are terminated. The present invention accomplishes similar results in a different manner and affords several advantages thereover as will be described more fully hereafter.

The factors of importance in parachutes and parachute systems of the type above described include stability, reliability, light weights and an acceptable rate of descent for the various payloads.

Accordingly, it is an object of this invention to provide a novel parachute which is simple, durable, reliable and easy to use and manufacture.

Another object of this invention is to provide a novel parachute capable of supporting various types of payloads at a slow rate of descent with a minimum of oscillation and swing of the payload.

A further object of this invention is to provide a load bearing parachute capable of being towed in a substantially flag-like configuration with a minimum of drag and oscillation so as to avoid paraplaning.

It is another object of this invention to provide an improved parachute suitable for towing which may be released while in tow and reopens to allow the payload to make a normal descent.

Still another object of this invention is to provide an improved and very reliable mid-air recovery system characterized by reduced snatch force and opening shock imparted to the payload.

Other objects, advantages and capabilities of the present invention will become more apparent as the following description proceeds taken in conjunction with the accompanying drawings in which:

FIG. 1 is a side elevation view of a mid-air recovery system embodying the present invention for supporting a payload with the engagement parachute and main parachute shown in the inflated airborne condition and a portion of the canopy of the main parachute broken away and the engagement parachute illustrated in section to show interior construction and a portion of the load line between the two parachutes eliminated for purposes of illustration;

FIG. 2 is a side elevation view showing somewhat schematically the position of the inner rigging lines of the canopy while being supported from towing forces supported from above by an aircraft;

FIG. 3 is a perspective view of a fragment of the central portion of the canopy and illustrating a preferred interconnecting arrangement between the load line, internal control lines and outer suspension lines carried by the canopy which cross the vented central portion of the canopy;

FIG. 4 is a perspective view showing the interconnection of the lower ends of one group of suspension lines with the interior rigging assembly;

FIG. 5 is a generally schematic elevation view of the mid-air recovery system of FIG. 1 in the parachute drop stage which is the first of five successive stages in a typical mid-air recovery operation having a failure or tear-out of the engagement parachute after engagement with the four remaining stages illustrated in FIGS. 6–9 in order;

FIG. 6 is a generally schematic elevation view of the system of FIG. 1 illustrating the engagement stage of operation wherein an aircraft having a pick-up hook assembly depending therefrom engages the engagement parachute and the central portion of the main parachute is partially drawn upwardly and the canopy begins to contract;

FIG. 7 is a generally schematic elevation view of the system of FIG. 1 illustrating the in-tow stage of operation wherein the aircraft is supporting and towing the payload from above the main canopy and the central portion is pulled upwardly so as to be the uppermost part of the canopy;

FIG. 8 is a generally schematic elevation view of the system of FIG. 1 illustrating the release stage of operation wherein the engagement hook is no longer engaging the engagement parachute and the main parachute is in a partially inflated condition; and FIG. 9 is a generally schematic elevation view of the system of FIG. 1 illustrating the main parachute in its fully reopened position so as to again support the payload at an acceptable rate of gravitational descent.

Referring now to the drawings, the components of an entire mid-air recovery system are illustrated in FIG. 1 and will first be described in general followed by a detailed description of the component parts. This system comprises a main load bearing parachute 2 illustrated in an airborne condition and supporting a payload 3. Above the main parachute 2 there is disposed an auxiliary or engagement parachute 4 illustrated in an airborne condition which is connected to the central portion of the canopy by a load line 5. The connections at the upper end of the load line 5 to the suspension lines 30 of the engagement parachute are provided by a clevis type member 6 attached to the converging ends of the suspension lines and a loop 7 in the upper end of the load line having the pin 8 of the clevis extending therethrough. Although a clevis and loop have been used for purposes of illustration, it is understood that other interconnections may be provided, such as fabricating or sewing interconnecting ends or loops on adjoining lines.

The main parachute 2 includes a canopy 11 having an aperture or air vent 12 in its central portion 13 and is provided with an outer or exterior suspension line assembly including a plurality of equally spaced suspension lines 14 connected to and carried by the canopy 11 and depending from points of attachment adjacent the outer edge of the canopy and an inner or interior rigging assembly including a plurality of control and load supporting lines 15, which are also load supporting lines, depending from the central portion of the canopy. In general, lines 14 and 15 are interconnected at adjoining lower portions in groups circumferentially of the canopy so as to spread the control lines outwardly an approximate equal distance from the center of the canopy and said lines are proportioned in lengthwise extent so as to pull the central portion of the canopy to a point substantially below the topmost portion of the canopy under the weight of the payload while airborne. Lines 14 and 15 are interconnected with the canopy and with the payload 3 to suspend the payload therefrom while airborne as shown and for contracting the canopy and supporting the payload when the main parachute 2 is being towed by forces applied from above the canopy and for reopening the canopy when the towing forces are removed as described more fully hereinafter.

This rigging and suspension arrangement carried by the canopy provides the main parachute with a profile as shown in FIG. 1 having an upper hemispherical-shaped portion A and a lower truncated cone-shaped portion B of substantial lengthwise extent. The outer edge or skirt lip C of the canopy is tangent to the suspension lines 14 and they are pulled inwardly to provide a negative angle of incidence. The central portion 13 during canopy inflation provides an essentially conical-shaped surface centrally of the canopy which provides a guide for a smooth transition of air flowing up the sides and through the center opening of the main parachute. This provides an essentially smooth transition from an upward flow to a downward flow and a uniform spill about the periphery of the skirt to reduce air turbulence within the canopy.

The outer suspension lines 14 are secured to the canopy as by stitching and extend in intersecting relation through the central portion 13 of the canopy and extend beyond the skirt or edge a substantial distance in the manner similar to the usual shroud or suspension lines of a parachute. They are arranged at their outer ends in groups of four for connection with the harness member and riser member as hereafter described.

The interior control lines 15 extend between the central portion of the canopy and the payload and have upper portions 15a preferably constructed in the form of a harness member comprising a group of lines, preferably four as shown, which converge at their upper ends and connect with the central portion of the canopy and lower portions 15b constructed in the form of payload risers comprising a group of lines, preferably four, as shown which converge at their lower ends and connect with the payload 3. Adjoining ends of each harness line and riser line are secured together by a coupling member hereafter described.

The interior control lines 15 which interconnect the central portion of the canopy with the payload assume two different positions, one (FIG. 1) while airborne and another while supported by forces applied from above the canpoy (FIG. 2). In the airborne or inflated position, the upper harness member portion 15a assumes an essentially inverted V-shaped configuration and the lower riser portion 15b assumes an essentially upright V-shaped configuration with the payload 3 being supported from the canopy by both the harness lines 15a and associated groups of suspension lines 14 through the riser lines 15b. The lengthwise extent of the harness lines 15a and suspension lines 14 are selected so that the central portion 13 of the canopy is pulled to a point substantially below the topmost portion of the canopy while airborne under the weight of the payload.

In the contracted position as shown in FIG. 2 a towing force is applied from above the canopy through the load line and the pressure on the inside of the canopy is relieved and the harness lines move inwardly. The central portion 13 is pulled up and the control lines move together to pull the suspension lines inwardly and transfer all of the weight of the payload from the suspension lines and control lines to the control lines 15 and thus remove all of the weight from the canopy.

The triangulation of the control lines 15 is arranged so that when the central portion is moved upwardly it reaches a position which would be the usual apex or uppermost portion of the canopy when contracted and the effective position of the payload with respect to the uppermost portion of the canopy remains the same. This arrangement reduces the engagement shock which would be produced by the recovery aircraft and depending engagement hook initially engaging the engagement parachute. The lengthwise extent of the riser lines 15b is selected so that the payload is substantially below the skirt or edge of the canopy in the deflated condition so as to avoid tangling and the like.

The interconnection of lines at the apex of the canopy is provided as shown in FIGS. 1 and 3 by grouping the intersecting portions 14a of suspension lines 14 crossing the aperture in the central portion 13 of the canopy and installing a clevis 18 around them and through a loop 19 in the upper end of the harness member. A clevis pin 21 connects the lower or loop-like end 22 of the load line 5 to the clevis thereby connecting the central portion of the canopy and the upper end of the harness member to the load line with the harness extending inside the canopy. The lower ends of the control lines 15 may be connected to the payload 3 in a manner similar to that at the upper ends with the load line 5. A loop 41 may be formed below the converging point of the lower ends of lines 15 and a loop 42 on the payload. A clevis 43 may connect these loops in the same manner as does clevis 18 illustrated in FIG. 3.

As shown more fully in FIG. 4, a preferred arrangement of interconnecting lines above the payload at the junction of the harness member 15a, payload risers 15b and suspension lines 14 is provided by a three juncture connector link assembly 20 inclusive of a pair of spaced plate members 23 and 24 of arcuate shaping having spaced end pin members 25 and 26 disposed in parallel relation at the ends and an intermediate pin member 27, which is also parallel to members 25 and 26. A group of the suspension lines (preferably one-fourth of the total number as shown) is connected to one outer pin member 25, and one (of the four as shown) of the harness lines 15a to the inner pin member 26 with the riser line 15b secured to the intermediate pin member 27. These connections of lines to the pin members are preferably by folding the ends over the pins back to the associated line to provide an end loop to permit pivotal movement of the lines on the associated pin members.

A preferred form of engagement parachute 4 as illustrated in FIG. 1 is of the type illustrated and described in my copending application Ser. No. 633,810 entitled "Parachute" and comprises a canopy 31 which may be of a square configuration having inside air confining members or cone-shaped venturas 32 (two illustrated on the half of the parachute shown) terminating in spaced relation to the central portion of the canopy and discharging air flow centrally thereof which produce stability and increased lift. This parachute has a greater drag coefficient and therefore flies higher to the vertical with sufficient drag to maintain the load line taut and present a stable target. This arrangement is such that it can be engaged in any direction eliminating the need for a load line position indicator. This engagement parachute is preferably provided with interconnected reinforcing members carried by the canopy of the type described in Patent No. 3,227,403 but not shown herein for purposes of clarity.

Referring now to the mid-air recovery system shown in FIGS. 5-9, the system is shown first in an airborne position with the payload 3 supported by the main parachute 2 and associated suspension and rigging assembly and the central portion of the canopy pulled down. The engagement parachute 4 is disposed above the main parachute and interconnected to its central portion by the load line 5.

A recovery aircraft 33 illustrated as a helicopter having a hook assembly 34 depending therefrom engages the auxiliary or pick-up parachute 4 (FIG. 6) and the payload 3 is moved in the direction of aircraft travel. After engagement, forces are applied to the central portion of the parachute 2 and through the harness member 15a to the payload 3. This force which is applied from above the canopy is applied to the convergence point at the central portion of the main chute canopy and relieves the pressure on the inside of the canopy and it begins to deflate as the stagnated air mass is forced out of the canopy. The pulled down central portion affords a larger area over which opening shock pressures are distributed.

As illustrated in FIG. 7 the canopy of the main parachute 2 and payload 3 are shown in the in-tow position with the canopy being deflated and the payload being directly supported through the control lines 15 from the load line 5. The canopy is disposed in a flag-like or wedge-shaped configuration and is kept deflated during tow by air flow over the surface of the canopy in the direction of flight.

By virtue of the suspension and rigging line arrangement of the canopy, in the tow position it is able to breathe and release pressure with a minimum of oscillation of the load. From the tow position as shown in FIG. 7 the payload may be delivered to a preselected location with the payload docked as required. A release device may be incorporated so as to release the payload from the parachute 2 upon docking and it may be drawn up into the aircraft. As an alternative, the payload and canopy may be drawn into the aircraft where larger recovery aircrafts are employed.

Referring now to FIG. 8, the reopening or re-deployment capability of the main parachute to again support the payload is shown immediately after the towing force has been terminated and the canopy begins to fill. This condition may result if there is a tear out of the engagement chute as illustrated or in the event of an emergency condition arising aboard the helicopter and the recovery must be aborted and the load line is cut. Another application is a requirement for airdropping the payload from the in-tow position from a low flying aircraft. Upon release of the towing forces the load is transferred from the harness and riser lines of the control line assembly 15 to the suspension lines 14 and control lines 15 and the central portion 13 again assumes its pulled down or inverted (FIG. 9) conical-shaped condition and the payload will make a normal descent for ground recovery. The construction and rigging is such that the load on opening is suspended from the central portion of the canopy. This uses the mass of the canopy as a decelerator until the canopy opens and part of the load is taken up by the suspension lines.

In further explanation of the arrangement and operation of the above described parachute, it is apparent that with control lines 15 of a corresponding or equal dimension connected at converging points at the upper and lower ends as shown and with upper portions 15a and extensions of the suspension lines 14 from the canopy of approximately equal length the weight of the payload is distributed between the central portion of the canopy and the outer edge or skirt portion of the canopy while airborne. This pulls the central portion of the canopy substantially below the topmost part of the canopy. Thus, the control assembly may be characterized as having a substantial portion of the weight of the payload supported from the upper portion 15a.

With the canopy in an essentially inflated condition as shown in FIG. 7 or immediately after deployment from a bag the skirt portion of the canopy is at an inner position adjoining the center of the canopy and will spread radially outwardly as it fills with air. The connection of end portions of the suspension lines between or intermediately of the joined upper and lower ends of the control lines 15 produces a bowstring like action on each control line as it draws them apart. This bowstring action in effect provides a force in opposing relation to the movement of the canopy in its radial spreading during inflation to control the opening of the canopy. When the recovery forces are applied from above to the load line attached to the upper ends of the control line the bowstring action moves in a reverse direction to assist in contracting the canopy and the weight of the payload is then transferred from the canopy to the control lines and the canopy is contracted.

While only a single main load parachute 2 having its central portion pulled down is shown, it will be understood that for heavier loads a cluster of similar main load-bearing parachutes may be employed. Assuming a cluster of three were provided, a cluster harness would be attached to the clevis 12 of each parachute and a common clevis at the lower end of the load line with the engagement parachute attached to the upper end of the load line in the same manner as above described.

From the foregoing description it is apparent that a mid-air recovery system employing the parachute as described will provide an increase in reliability because of the elimination of possible failure features such as more complicated rigging and suspension lines, packaging procedures, the removal of pyrotechnics and shear pins. A release mechanism for separating the main parachute is not required. This improved system has the capability of being towed and reopened in the event the system must be released and jettisoned because of an emergency condition arising aboard the helicopter or the like condition.

By utilizing the unique rigging and suspension system, it has been found that the canopy during tow is able to breathe and relieve pressure without causing oscillation of the load. The drag area of the uninflated canopy is reduced to a minimum by pulling the central portion of the canopy down to the outer edges thereof with the harness line arrangement. The suspension and rigging arrangement is such that the payload on opening is suspended from the central portion of the canopy. With the load so suspended in part from the central portion of the canopy there is a minimum of swing-through or oscillation on deployment. The reduction of suspension line length provides an increase in the dampening of the parachute motion.

The pulling down of the central portion of the main parachute provides a much larger area over which the opening shock pressures are distributed and this distribution of pressure during opening minimizes damage to the canopy of the main parachute. High pressure opening shock is one of the major problems in utilizing parachutes in such mid-air recovery systems. The pulling down of the central portion has been found to provide a definite damping effect on oscillation. This pull-down arrangement forms, in effect, an inverted conical-like surface which provides a guide for a smooth transition of air flowing up the sides and into the central opening of the main parachute. This has been found to almost completely eliminate air turbulence within the canopy.

In the mid-air recovery system as above described, the main canopy is retained for reuse and this eliminates a major portion of canopy damage caused by trees, bushes and the like and can be used again so as to reduce costs. The engagement parachutes may be of various types and of a nominal diameter and must provide the necessary drag to support the load line and must be of sufficient strength to withstand the loads during recovery. The main load-bearing parachute may be of various sizes depending upon the load to be recovered. The rigging harness 15a is fabricated so that its tensile strength is equivalent to the combined strength of the suspension lines 14. As compared to the previous copending application Ser. No. 559,197 above referred to, there are fewer rigging lines within the canopy and less likelihood of tangling or the like during reopening.

I claim:

1. In a parachute including a canopy and suspension lines connected at spaced points on the canopy and extending beyond the outer edges of the canopy for the support of a payload therefrom, a control assembly for said canopy and suspension lines including a plurality of control and load supporting line means of a corresponding dimension converging at upper end portions arranged for support from a central portion of the canopy and converging at a lower end portion arranged for connection to a payload, an intermediate portion of one of each of said control and load supporting line means being attached to end portions of a group of said suspension lines, each said control and load supporting line means including an upper portion above its attachment to an associated group of suspension lines having a substantial portion of the weight of the payload supported therefrom for distribution of the weight of the payload between the central portion and outer edge portions of the canopy to pull the central portion of the canopy substantially below the topmost part of the canopy and thereby spread each control and load supporting line means in a bowstring action outwardly from each other and from a vertical axis through the center of the canopy during airborne descent of the payload.

2. In a parachute as set forth in claim 1 wherein said suspension lines are arranged in four groups which are attached to four associated control and load supporting line means.

3. In a parachute as set forth in claim 1 wherein a portion of each of said control and load supporting line means is held in an equally spaced relation from the center of the canopy and the converging point of the upper ends of the control and load supporting line means is held above the outer edge portions of the canopy by the associated attached suspension lines and depending payload while airborne.

4. A parachute as set forth in claim 1 wherein said canopy while airborne has a hemispherical-shaped upper portion and a truncated cone-shaped lower portion.

5. In a parachute including a canopy and suspension lines connected at spaced points on the canopy and extending beyond the outer edges of the canopy for the support of a payload therefrom, a control assembly for said canopy and suspension lines including a plurality of control and load supporting lines of a corresponding dimension converging at upper end portions arranged for support from a central portion of the canopy and converging at a lower end portion arranged for connection to a payload, means for attaching an intermediate portion of one of each of said control and load supporting lines to a group of said suspension lines, each of said group of suspension lines in their extension beyond the canopy and an upper portion of an associated control and load supporting line above its point of attachment to the suspension lines being of approximately equal length for distributing the weight of the payload between the central portion and outer edge portions of the canopy to pull the central portion of the canopy substantially below the topmost part of the canopy and thereby spread each control and load supporting line in a bowstring action outwardly from each other and from a vertical axis through the center of the canopy during airborne descent of the payload.

6. A parachute assembly comprising a canopy having a central portion, suspension means carried by said canopy and arranged for supporting a payload from the canopy and suspension means, said suspension means including a plurality of suspension lines having portions connected at spaced points on the canopy and extending beyond the edges thereof, a plurality of control and load supporting line means of substantially equal dimension disposed interiorly of the canopy and supported at their upper ends from said central portion of the canopy and joined at a lower end portion for connection to a payload, means for interconnecting an intermediate portion of each of said control and load supporting line means with a group of said suspension lines, each said control and load supporting line means including an upper portion above its attachment to an associated group of suspension lines having a substantial portion of the weight of the payload supported therefrom, said control and load supporting line means being moved inwardly to a first position for contracting the canopy and transferring the weight of the payload from the canopy to the control and load supporting line means when forces are applied to the upper ends of the control and load supporting line means from above and said canopy being spread outwardly in a bowstring action under the control of the control and load supporting line means to a second position for reopening the canopy to again suspend the canopy by air intake when the forces from above are terminated.

7. A parachute assembly as set forth in claim 6 wherein the distance between the payload and the uppermost point of the canopy is substantially the same in said first contracted position and second spread position.

8. A parachute assembly as set forth in claim 6 wherein said control and load supporting line means includes an upper harness member connected at its upper end to the central portion of the canopy and a lower riser member connected to the lower end of the payload, said harness member converging at its upper ends and diverging at its lower ends and said riser member converging at its lower end and diverging at its upper ends, and including a connector assembly for slidably attaching adjoining end portions of said members to adjoining end portions of a group of said suspension lines.

9. A parachute assembly as set forth in claim 6 wherein said suspension lines extend in intersecting relation through said central apex portion of the canopy and said upper end portions of said control and load supporting line means are attached with said suspension lines at said intersection.

10. A parachute assembly comprising a canopy having a central portion, rigging means carried by said canopy and arranged for suspension of a payload from the canopy, said rigging means including suspension lines connected at spaced points on the canopy and extending outwardly therefrom, a plurality of control and load supporting line means having upper portions converging at their upper ends and lower portions converging at their lower ends, means for connecting said upper ends to the central portion of the canopy, means for connecting said lower ends to the payload so as to directly support the payload when the canopy is being supported by forces applied from above the canopy, means for connecting each of said control and load supporting line means at a point between the upper and lower ends thereof to an associated group of said suspension lines, each said control and load supporting line means including a portion above its attachment to an associated group of suspension lines having a substantial portion of the weight of the payload supported therefrom for distributing the weight of the payload between the central portion and outer edge portion of the canopy, said plural groups of said suspension lines being drawn together under the weight of the payload when the canopy and payload are being supported by said forces applied from above the canopy to thereby contract the canopy, said control and load supporting line means pulling the central apex portion of the canopy to a point substantially below the top of the canopy while portions of said control and load supporting line means distant from said central portion and said payload are moved to positions spaced a substantial distance from the center of the canopy by the canopy and associated suspension lines when said forces from above the canopy are removed and the canopy moves by air intake at a rate controlled by said control and load supporting line means to an open inflated position.

11. A mid-air recovery system comprising a main parachute, an engagement parachute disposed above the main parachute and connected thereto by a load line, said main parachute including a canopy having a central portion, suspension means carried by said canopy and arranged for suspension of a payload therefrom, said suspension means including a plurality of suspension lines having portions connected at spaced points on the canopy and extending beyond the edges thereof, a plurality of control and load supporting lines disposed interiorly of the canopy of a corresponding dimension converging at upper end portions and supported from said central portion of the canopy and converging at lower end portions attached to a payload, means for connecting an intermediate portion of each of said control and load supporting lines with a group of said suspension lines, each said control and load supporting line including an upper portion above its attachment to an associated group of suspension lines having a substantial portion of the weight of the payload supported therefrom for distributing the weight of the payload between the central portion and outer edge portions of the canopy to pull the central portion of the canopy substantially below the topmost part of the canopy and spread each control and load supporting line in a bowstring action outwardly from each other and from a vertical axis through the center of the canopy while airborne, said control and load supporting lines being moved inwardly to a first position to transfer the weight of the payload from the canopy to the control and load supporting lines and to contract the canopy when forces are applied to the control and load supporting lines from above by engagement of the parachute by a recovery aircraft for support therefrom in a flag-like towing configuration and said control and load supporting lines being spread outwardly in said bowstring action for reopening the canopy for air filling at a controlled rate to again suspend the canopy in a load bearing condition when the towing forces of the recovery aircraft are terminated.

12. A mid-air recovery system as set forth in claim 11, wherein said engagement parachute includes a canopy having at least one tubular air confining member carried on an undersurface thereof for directing a restricted flow of air upwardly along an undersurface of the canopy for release adjacent its central apex portion.

13. In a parachute including a canopy and suspension lines connected at spaced points on the canopy and extending beyond the outer edges of the canopy for the support of a payload therefrom, a control assembly for said canopy and suspension lines including a plurality of control and load supporting line means of approximately equal dimension converging at upper end portions arranged for support from a central portion of the canopy and converging at a lower end portion arranged for connection to a payload, means for attaching an intermediate portion of one of each of said control and load supporting line means to a group of said suspension lines, each said control and load supporting line means above its attachment to an associated group of suspension lines having a substantial portion of the weight of the payload supported therefrom to distribute the weight of the payload between the central portion and outer edge portions of the canopy for controlling the inflation of the canopy from an uninflated condition with the control and load supporting line means pulled together under the weight of the payload to a progressive spreading of the control and load supporting line means in a bowstring action outwardly from each other and from a vertical axis through the center of the canopy as the canopy fills to an inflated condition during airborne descent of the payload.

14. In a parachute assembly as set forth in claim 13 wherein said attaching means for each of said control and load supporting line means and group of suspension lines includes a connector assembly connected to an associated control and load supporting line means and having means over which the end portions of a group of the suspension lines are folded for slidable movement of the end portions of a group of suspension lines during said progressive spreading movement.

References Cited

UNITED STATES PATENTS

| | | | |
|---|---|---|---|
| 2,468,130 | 4/1949 | Stallworth | 244—148 |
| 2,594,018 | 4/1952 | Hillesheim | 244—151 |
| 3,055,621 | 9/1962 | Martin | 244—142 |
| 3,137,465 | 6/1964 | Mulcahy | 244—142 |

FOREIGN PATENTS

| | | |
|---|---|---|
| 824,349 | 11/1937 | France. |
| 1,189,186 | 3/1959 | France. |

MILTON BUCHLER, *Primary Examiner.*

R. A. DORNON, *Assistant Examiner.*

U.S. Cl. X.R.

244—149, 151, 152